United States Patent
Theocharous et al.

(10) Patent No.: US 11,501,207 B2
(45) Date of Patent: Nov. 15, 2022

(54) LIFELONG LEARNING WITH A CHANGING ACTION SET

(71) Applicant: ADOBE INC., San Jose, CA (US)

(72) Inventors: Georgios Theocharous, San Jose, CA (US); Yash Chandak, Amherst, MA (US)

(73) Assignee: ADOBE INC., San Jose, CA (US)

( * ) Notice: Subject to any disclaimer, the term of this patent is extended or adjusted under 35 U.S.C. 154(b) by 654 days.

(21) Appl. No.: 16/578,913

(22) Filed: Sep. 23, 2019

(65) Prior Publication Data

US 2021/0089958 A1 Mar. 25, 2021

(51) Int. Cl.
*G06N 20/00* (2019.01)
*G06N 7/00* (2006.01)
*G06N 5/04* (2006.01)

(52) U.S. Cl.
CPC ............ *G06N 20/00* (2019.01); *G06N 5/045* (2013.01); *G06N 7/005* (2013.01)

(58) Field of Classification Search
CPC ........ G06N 20/00; G06N 5/045; G06N 7/005; G06N 3/08
See application file for complete search history.

(56) References Cited

U.S. PATENT DOCUMENTS

| | | | |
|---|---|---|---|
| 2016/0098642 A1* | 4/2016 | Tsitkin | G06N 7/005 706/12 |
| 2018/0293514 A1* | 10/2018 | Koseki | G06N 5/04 |
| 2020/0372323 A1* | 11/2020 | Tatsubori | G06K 9/6215 |
| 2022/0101177 A1* | 3/2022 | Zadorojniy | G06N 5/003 |

OTHER PUBLICATIONS

Boutilier, et al., "Planning and Learning with Stochastic Action Sets", arXiv:1805.02363v1[cs.At] May 7, 2018, pp. 1-18.*
Mandel, et al., "Where to Add Actions in Human-in-the-Loop Reinforcement Learning", Proceedings of the Thirty-First AAAI Conference on Artificial Intelligence (AAAI-17), pp. 2322-2328.

* cited by examiner

*Primary Examiner* — Walli Z Butt
(74) *Attorney, Agent, or Firm* — F. Chau & Associates, LLC

(57) ABSTRACT

Systems and methods are described for a decision-making process that includes an increasing set of actions, compute a policy function for a Markov decision process (MDP) for the decision-making process, wherein the policy function is computed based on a state conditional function mapping states into an embedding space, an inverse dynamics function mapping state transitions into the embedding space, and an action selection function mapping the elements of the embedding space to actions, identify an additional set of actions in the increasing set of actions, update the inverse dynamics function based at least in part on the additional set of actions, update the policy function based on the updated inverse dynamics function and parameters learned during the computing the policy function, and select an action based on the updated policy function.

20 Claims, 9 Drawing Sheets

LIFELONG LEARNING WITH A CHANGING ACTION SET

BACKGROUND

Embodiments of the present disclosure relate generally to real-world sequential decision-making and more particularly, to decision-making where the set of available actions grows over time.

A variety of systems are used to automate decision-making processes. For example, some of these systems use reinforcement learning modes, such as a lifelong Markov decision process (MDP). An MDP is a discrete-time stochastic control process that provides a model of decision making in situations where outcomes are partly random and partly under the control of a decision-maker.

However, real-world problems are often non-stationary. For an agent deployed in real-world settings, the possible decisions the agent makes can change over time. In other words, parts of the problem specification change over time. Conventional MDP models do not account for circumstances that include a growing or changing action set. Therefore, there is a need in the art for autonomous systems that continually adapt to new actions.

SUMMARY

A method, apparatus, non-transitory computer-readable medium, and system for reinforcement learning with autonomous adaptation are described. Embodiments of the method, apparatus, non-transitory computer-readable medium, and system may identify a decision-making process that includes an increasing set of actions, compute a policy function for a Markov decision process (MDP) for the decision-making process, wherein the policy function is computed based on a state conditional function mapping states into an embedding space, an inverse dynamics function mapping state transitions into the embedding space, and an action selection function mapping the elements of the embedding space to actions, identify an additional set of actions for an agent of the MDP, update the inverse dynamics function based at least in part on the additional set of actions, update the policy function based on the updated inverse dynamics function; receive state information for the agent, select an action based on the updated policy function and the state information, and transmit an action recommendation to the agent based on the selected action.

Another method, apparatus, non-transitory computer-readable medium, and system for reinforcement learning with autonomous adaptation are described. Embodiments of the method, apparatus, non-transitory computer-readable medium, and system may compute a policy function for a Markov decision process (MDP) model of a decision-making process, wherein the policy function is computed based on a state conditional function mapping states into an embedding space, an inverse dynamics function mapping state transitions into the embedding space, and an action selection function mapping the elements of the embedding space to actions; identify an additional set of actions in an increasing set of actions of the MDP; update the inverse dynamics function and the action selection function during a first phase based at least in part on the additional set of actions by maximizing a lower bound of a loss function; update the state conditional function during a second phase following the first phase using a policy gradient; and select an action using on the updated state conditional function and the updated action selection function.

Another method, apparatus, non-transitory computer-readable medium, and system for reinforcement learning with autonomous adaptation are described. Embodiments of the method, apparatus, non-transitory computer-readable medium, and system may compute a policy function for a Markov decision process (MDP) for a decision-making process that includes an increasing set of actions; receive state information for an agent of the decision making process; transmit a recommended action to the agent based on the policy function and the state information; receive an additional set of actions from the agent; update the policy function based at least in part on the additional set of actions and parameters learned during the computing the policy function; receive subsequent state information for the agent; and transmit a subsequent recommended action to the agent based on the updated policy function and the subsequent state information.

DETAILED DESCRIPTION

Figure 1:
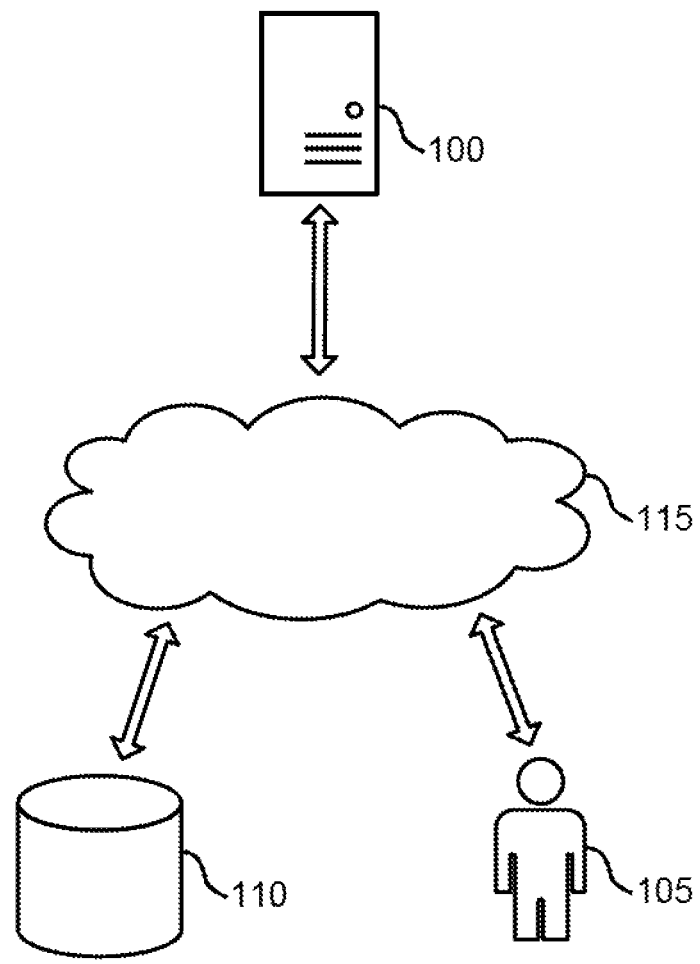
FIG. 1 shows an example of a reinforcement learning system according to aspects of the present disclosure.

The present disclosure describes systems and methods for automated sequential decision-making that autonomously adapt to a growing action set. Sequential decision-making refers to a class of problems where a decision-making agent must select an action from a set of available options during each of a series of time periods. In some cases, the set of available actions may grow over time.

For example, in robotics, it is common to add control components over the lifetime of a robot to enhance its ability to interact with the environment. In another example, drug prescriptions, new procedures, or medications are continually added as new options become available in medical support systems. Other examples include new marketing options that are created based on market trends, new products that become available to a product recommendation system, and new tutorials that become available in a tutorial recommendation system.

In each of these examples, it is desirable for an automated decision-making system to make decisions or recommendations that take into account all available options. Reinforcement learning (RL) refers to a class of methods for solving sequential decision-making problems in which a decision making algorithm is updated based on a reward function.

However, RL applications have been limited to settings where the set of actions is fixed. This is because RL systems are designed to solve a mathematical formalization of decision problems called Markov decision processes (MDPs), which typically assume a fixed action set. Thus, in a conventional RL model, when the action set changes, the system must be retrained in a way that doesn't take advantage of the previous learning.

The present disclosure describes systems and methods that perform automatic sequential decision-making in a manner that adapts to new actions while taking advantage of learning that occurred using the previous action set. Specifically, a model is trained that maps available actions into an embedding space that provides a notion of how the different actions relate to each other. When new actions emerge, they are also mapped into the embedding space. Thus, the component of the trained model that maps the embedding space onto a probability distribution for selecting actions may take advantage of previous learning about the embedding space. For example, leveraging the structure of the underlying action space improves generalization by allowing the agent to infer the outcomes of actions similar to actions already taken.

In an example embodiment, a system identifies an MDP for a decision-making process, and computes a policy function based on a state conditional function (i.e., for mapping states into the embedding space), an inverse dynamics function (i.e., for mapping actions into the embedding space based on associated state transitions), and an action selection function (i.e., for mapping the elements of the embedding space to actions). Then when the system identifies an additional set of actions, it may update the state conditional function, the inverse dynamics function, and the action selection function. The policy function may then be recomputed based on the updated mapping functions.

By utilizing models that incorporate an embedding space for the action set, previous learning may be more effectively utilized after new actions become available. Thus, the decision-making system may provide more suitable decisions or recommendations in real-world circumstances where the set of available actions is subject to change. Furthermore, incorporating the new actions into the model may be done in a more computationally efficient manner.

The following terms are used throughout the present disclosure.

A Markov decision process (MDP) is a framework for modeling decision making in situations where outcomes are partially under the control of a decision maker (the agent). Decisions are made by selecting an action based on a current state. The selected action impacts the future state (along with other random factors), which in turn impacts future decisions. Examples of decision making processes that can be modeled with an MDP include medical procedure selection, robot control, tool recommendation and marketing channel selection.

An action set refers to the set of actions that are available to an agent at any given time in an MDP. Traditional MDP models assume that the action set is constant. However, in many real-world applications, the set of available actions increases over time. For example, new medical procedures or drugs may be developed, new capabilities many be added to a robotic control system, new tools may be added to a software application, or new marketing options may become available.

A policy function refers to the function of an MDP that takes the current state as input and outputs an action (or a probability distribution over a set of actions). In other words, the policy function determines what decision the agent should make at any given time. The policy function may be implemented as a complex polynomial or with one or more neural networks.

Typically, an agent seeks to find the optimal policy function that maximizes some objective function over time. For example, it is desirable to select a medical procedure that maximizes health outcomes. In the robot control example, the policy function may be selected that minimizes the time it takes to successfully perform a task. In a tool recommendation scenario, the goal may to minimize the time it takes to learn how to use a software application effectively. In the marketing context, the goal may be to maximize sales revenue or lead generation.

A policy gradient refers to the gradient of the objective function with respect to a parameterization of the policy function. The policy function may be written in a form that depends on one or more parameters, and the policy gradient represents how the overall objective is impacted when the parameters are changed. The parameters may correspond to polynomial coefficients, or of weights in a neural network. A variety of well known algorithms may be used to compute the policy gradient, including REINFORCE, Actor-Critic, Deterministic Policy Gradients (DPG), Proximal Policy Optimization, etc.

An embedding space refers to a vector space in which the action set is embedded. The embedding space represents a structure on the action set which is based on the impact that different actions have on the state (i.e., state transitions). When new actions are added to an action set, they can be represented in the embedding space in a way that leverages learning that happened with previous actions.

For example, in a medical procedure context, the embedding space may represent the impact of a particular treatment in different circumstances, which may be determined based on observing the effects of particular treatments under a variety of circumstances. In a robot control context, the embedding space may represent the results of different robot movements under different conditions. In a tool recommendation context, the embedding space may represent how a user learns or reacts to a tool recommendation. In a marketing context, the embedding space may represent how potential customers react to different product placements or advertisements.

A state conditional function maps the state to the embedded space of actions. In effect, the state conditional function represents the selection of an action based on the state. However, instead of providing an action or a probability distribution across actions themselves, the state conditional function maps to the embedded representation of the actions.

For example, in the medical treatment context, the state conditional function represents the function that takes medical circumstances into account. In the robot control context, the state conditional function may take sensor input that indicates an external state. In the tool recommendation context, the state conditional function may take user profile or user history information as input. In a marketing context, the state conditional function may take user profile, user history, sales data, and other external data as input. In each case, the output is a vector or vector distribution in the embedding space.

An action selection function maps the embedding space of actions to a specific action or a probability distribution over a set of actions in the action set itself. The action selection function together with the state conditional function form the policy function.

For example, in the medical treatment context, the action selection function provides a medical treatment recommendation. In the robot control context, the output may be a control signal. In the tool recommendation context, the output may be a tool recommendation. In the marketing context, the output may be a recommended advertisement or product placement. In each case, the output may be in the form of a distribution over potential actions.

The inverse dynamics function maps an input that includes an action and a state transition into the embedding space. Training the inverse dynamics function enables the underlying structure of the embedding space to be discovered (or modeled).

For example, in the medical treatment context, the inverse dynamics function may represent a mapping from treatments and outcomes into the embedding space. In the robot control example, the inverse dynamics function may represent a mapping from control signals and observed changes in sensory data or state models to the embedding space. In the tool recommendation context, the inverse dynamics function may represent a mapping from tool recommendations and observed responses to the embedding space. In the marketing context, the inverse dynamics function may represent a mapping from advertisements and observed consumer reactions to the embedding space.

Figure 5:
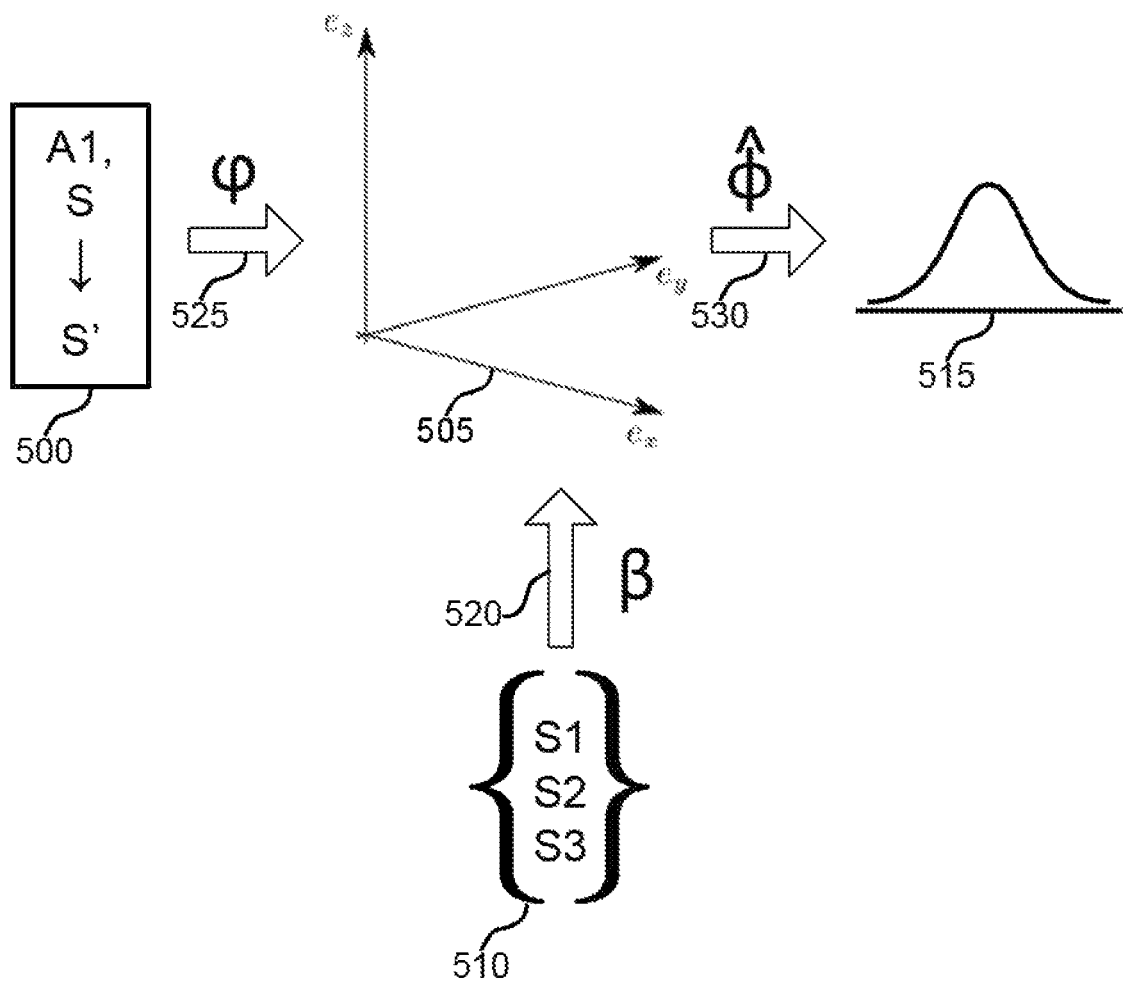
FIG. 5 shows an example of an action set embedding according to aspects of the present disclosure.

The relationship between the state conditional function, the action selection function and the inverse dynamics function is represented with reference to FIG. 5.

FIG. 1 shows an example of a reinforcement learning system according to aspects of the present disclosure. The example shown includes server 100, agent 105, action source 110, and network 115. Server 100 may include a model that provides recommendations to agent 105. Information about a changing action set is provided by action source 110. Each of these elements communicates via network 115. Server 100 may be an example of, or include aspects of, the corresponding element or elements described according to FIG. 8. In some cases, server 100 receives an action set and state information and from the agent 105, and provides a recommended action in response to the state information.

In real-world problems where the set of possible actions changes, there is often underlying structure in the set of all possible actions (those that are available, and those that may become available). For example, tutorial videos can be described by feature vectors that encode their topic, difficulty, length, and other attributes. In robot control tasks, primitive locomotion actions like left, right, up, and down could be encoded by their change to the Cartesian coordinates of the robot, etc. The agent 105 may know that such a structure exists, but may not be aware of the precise form. If actions are viewed from this perspective, then the set of all possible actions (those that are available at one point in time, and those that might become available at any time in the future) can be viewed as a vector-space, $\mathbb{E} \subseteq \mathbb{R}^d$.

Thus, due to the regularities in real-world problems, an underlying structure in the space of actions may be utilized to improve learning. The structure of the underlying action space can be recovered from interactions with the environment. That is, actions can be embedded into a vector space based on observations of how the actions change the state of a system.

An MDP is a tuple $\mathcal{M} = (\mathcal{S}; \mathcal{B}; \mathcal{P}; \mathcal{R}; \gamma; d0)$, $\mathcal{S}$ is the set of all possible states that the agent 105 can be in, called the state set. Although the math notation implies that $\mathcal{S}$ is countable, the primary results extend to MDPs with continuous states. $\mathcal{B}$ is a finite set of all possible actions that the agent can take, called the base action set. St and At are random variables that denote the state of the environment and action chosen by the agent at time $t \in \{0, 1, \ldots\}$. $\mathcal{P}$ is called the transition function and characterizes how states transition: $\mathcal{P}(s, a, s') := P_r(S_{t+1}=s'|S_t=s, A_t=a)$. $R_t \in [-R_{max}, R_{max}]$, a bounded random variable is the scalar reward received by the agent at time t, where $R_{max}$ is a finite constant. $\mathcal{R}$ is called the reward function, defined as $\mathcal{R}(s, a) := E[R_t|S_t=s, A_t=a]$ The reward discount parameter, $\gamma \in [0, 1)$ characterizes how the utility of rewards to the agent decays based on how far in the future they occur. Finally, d0 is the start state distribution, defined as $d_0(s) := \Pr(S_0=s)$.

A lifelong MDP model includes variables that govern when and how new actions are added. Specifically, $I_k \in \{0, 1\}$ refers to a random variable that indicates whether a new set of actions is added at the start of episode k and frequency $\mathcal{F}: \mathbb{N} \to [0, 1]$ is the associated probability distribution over episode count, such that $\Pr(I_k=1) = \mathcal{F}(k)$. $U_k \in 2^\varepsilon$ is the random variable corresponding to the set of actions that is added before the start of episode k. When $I_k=1$, assume that $U_k=\emptyset$, and when $I_k=0$, assume that $U_k \neq \emptyset$. $\mathcal{D}$ is the distribution of $U_k$ when $I_k=1$, i.e., $U_k \sim \mathcal{D}$ if $I_k=1$. Whether any actions are added can depend on the episode number (via $\mathcal{F}$). The distribution, $\mathcal{D}$, from which new actions is sampled is fixed and may not depend on the episode number, k, nor the behavior of the agent.

The agent may not know the structure of the space associated with the actions. Instead, a set of discrete actions, $\mathcal{A}_k$, are provided. To this end, an action selection function, $\phi$, is a map relating the underlying structure of the new actions to the observed set of discrete actions $\mathcal{A}_k$ for all k, i.e., if $U_k = u_k$, then $\mathcal{A}_k = \{\phi(e_i)|e_i \in u_k\}$. In some cases, neither the underlying structure $\varepsilon$, nor the distribution $\mathcal{D}$, nor the frequency of updates $\mathcal{F}$, nor the relation $\phi$ is known. Rather, the agent has access to the observed set of discrete actions.

A lifelong Markov decision process (L-MDP) is given by $\mathcal{L} = (\mathcal{M}_0, \varepsilon, \mathcal{D}, \mathcal{F})$, which extends a base MDP, $\mathcal{M}_0 = (\mathcal{S}, \mathcal{A}, \mathcal{P}, \mathcal{R}, \gamma, d_0)$. $\mathcal{S}$ is the set of all possible states that the agent can be in, called the state set. $\mathcal{A}$ is the discrete set of actions available to the agent. For $\mathcal{M}_0$, this set may be empty, i.e., $\mathcal{A} = \emptyset$. When the set of available actions changes and the agent observes a new set of discrete actions, $\mathcal{A}_k$, then $\mathcal{M}_{k-1}$ transitions to $\mathcal{M}_k$, such that $\mathcal{A}$ in $\mathcal{M}_k$ is the set union of $\mathcal{A}$ in $\mathcal{M}_{k-1}$ and $\mathcal{A}_k$.

Apart from the available actions, other aspects of the L-MDP may remain the same throughout. Use $S_t \in \mathcal{S}, A_t \in \mathcal{A}$, and $R_t \in \mathbb{R}$ as random variables for denoting the state, action, and reward at time $t \in \{0, 1, \ldots\}$ within each episode k. The first state, $S_0$, comes from an initial distribution, $d_0$, and the reward function $\mathcal{R}$ is defined to be only dependent on the state such that $\mathcal{R}(s) = \mathbb{E}[R_t|S_t=s]$ for all $s \in \mathcal{S}$. Assume that $R_t \in [-R_{max}, R_{max}]$ for some finite $R_{max}$. The reward discounting parameter is given by $\gamma \in [,1)$. $\mathcal{P}$ is the state transition function, such that for all s, a, s', t, the function $\mathcal{P}(s, a, s')$ denotes the transition probability $P(s'|s, e)$, where $a = \phi(e)$.

In some examples, new actions may be completely arbitrary and may have no relation to the ones seen before. In such cases, there may be less value in leveraging experience. Thus, in some embodiments of the present disclosure, it is assumed that transition probabilities in an L-MDP are $\rho$-Lipschitz in the structure of actions, i.e., $$\exists \rho > 0 \text{ s.t. } \forall s, s', e_i, e_j \|P(s'|s, e_i) - P(s'|s, e_j)\|_1 \leq \rho \|e_i - e_j\|_1 \quad \text{(Eq. 1)}$$

For any given MDP $\mathcal{M}_k$ in $\mathcal{L}$, an agent's goal is to find a policy, $\pi_k$, that maximizes the expected sum of discounted future rewards. For any policy $\pi_k$, the corresponding state value function is $v^{\pi_k}(s) = \mathbb{E}[\Sigma_{t=0}^{\infty} \gamma^t R_t | s, \pi_k]$. Finding an optimal policy when the set of possible actions is large is more difficult due to the curse of dimensionality.

$\pi^*_k$ may represent an optimal policy for MDP $\mathcal{M}_k$ among policies that use actions available during the $k^{th}$ episode. It is possible to quantify how suboptimal $\pi^*_k$ is relative to the performance of a hypothetical policy, $\mu^*$, that acts optimally given access to all possible actions.

In an L-MDP, let $\epsilon_k$ denote the maximum distance in the underlying structure of the closest pair of available actions, $$\text{i.e., } \epsilon_k := \sup_{a_i \in \mathcal{A}} \inf_{a_j \in \mathcal{A}} \|e_i - e_j\|_1,$$

then $$v^{\mu^*}(s_0) - v^{\pi^*_k}(s_0) \le \frac{\gamma \rho \epsilon_k}{(1-\gamma)^2} R_{max} \quad \text{(Eq. 2)}$$

With a bound on the maximum possible sub-optimality, Eq. 2 presents a significant connection between achievable performances, the nature of underlying structure in the action space, and available actions in any given $\mathcal{M}_k$.

$\mathcal{Y} \subseteq \varepsilon$ may represent the smallest closed set such that, $P(U_t \subseteq 2^{\mathcal{Y}}) = 1$. $\mathcal{Y}$ is the element-wise-support of $U_t$. If the element-wise-support of $U_t$ in an L-MDP is $\varepsilon$, then as $k \to \infty$ the sub-optimality vanishes. That is, $$\lim_{k \to \infty} v^{\mu^*}(s_0) - v^{\pi^*_k}(s_0) \to 0. \quad \text{(Eq. 3)}$$

Thus, the change in optimal performance converges to zero as new actions are added. Consequentially, new actions that become available indirectly provide more information about the underlying, unknown, structure of $\varepsilon$. However, in the limit, as the size of the available action set increases, the information provided by each new action vanishes and thus performance saturates.

In practice, $k \to 2^8$ may not be achieved. However, even when the underlying structure $\varepsilon$, the distribution $\mathcal{D}$, the change frequency $\mathcal{F}$, and the mapping relation $\phi$ are all unknown, the unknown variables establish that the difference between the performances in successive changes may remain bounded and will not fluctuate arbitrarily. Thus, according to the present disclosure, decision-making systems can build upon their past experiences using updates to existing policies that efficiently leverage estimates of the structure of $\varepsilon$ to adapt to new actions.

Figure 2:
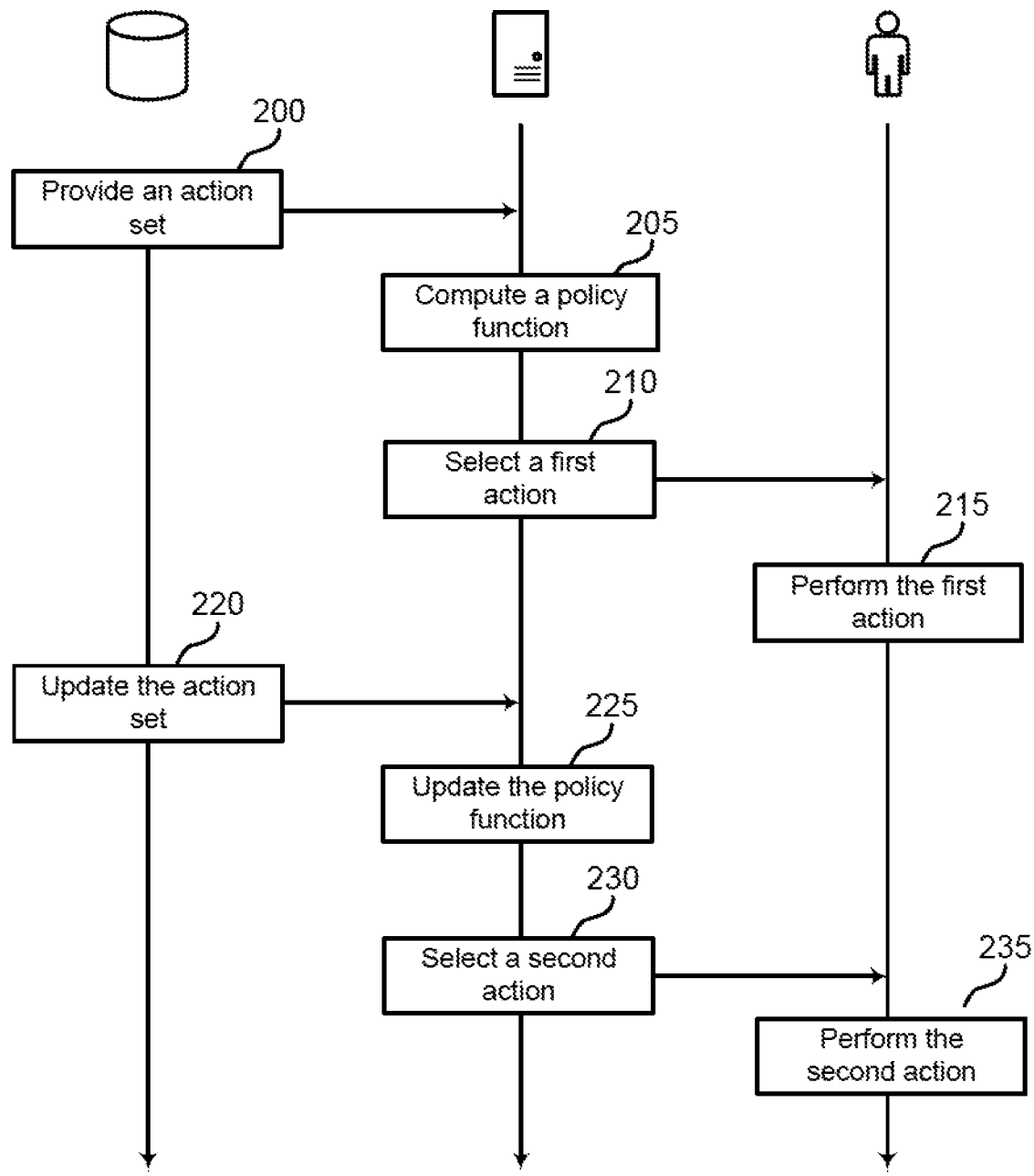
FIG. 2 shows an example of a decision-making process with autonomous adaptation according to aspects of the present disclosure.

FIG. 2 shows an example of a decision-making process with autonomous adaptation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 200, the system provides an action set. The action set may correspond to a decision-making process modeled using an MDP model. In some cases, the operations of this step may be performed by an action source as described according to FIG. 1. In various examples, the decision-making process may represent: a tool recommendation engine, where the actions are based on a changing set of tools; selection of an advertisement, where the actions are based on a set of available ads; a robot control mechanism, where actions represent a set of available actuator movements; a product recommendation system, where the actions are based on product availability; or a medical recommendation system, where the actions are based on a changing set of available medical interventions.

At operation 205, the system computes a policy function for an MDP. In some cases, the operations of this step may be performed by a server as described according to FIGS. 1 and 8. The policy function may be a function that takes a current state and a set of available actions as input and provides a probability distribution over the set of available actions as output. The probability distribution indicates the likelihood that each of the available actions should be selected.

In some examples, the policy function may include a combination of two separate models (e.g., neural networks) corresponding to a state conditional function and an action selection function. In some cases, the policy is computed using a policy gradient algorithm based on a divergence such as a Kullback-Leibler divergence (KLD) or a Bregman divergence. In some examples, the policy function is represented as a neural network and may be trained using a reward (or loss function) as described according to FIG. 8.

At operation 210, the system selects a first action from the action set. In some cases, the operations of this step may be performed by a server as described according to FIGS. 1 and 8. For example, the system may make a tool recommendation, selection of an advertisement, a robot control decision, a product recommendation, or a medical recommendation. In some examples, the system selects the first action by producing a random number and using the random number to select an action based on a probability distribution output by the policy function.

At operation 215, the system performs the first action. In some cases, the operations of this step may be performed by an agent as described according to FIG. 1.

At operation 220, the system updates the action set with additional actions. In some cases, the operations of this step may be performed by an action source as described according to FIG. 1. At operation 225, the system updates the policy function based on the updated action set. In some cases, the operations of this step may be performed by a server as described according to FIGS. 1 and 8. For example, the system may update the policy function by updating a state conditional function, an inverse dynamics function, and an action selection function (e.g., using the process described below in Algorithm 1).

At operation 230, the system selects a second action from the updated action set based on the updated policy function. In some cases, the operations of this step may be performed by a server as described according to FIGS. 1 and 8. At operation 235, the system performs the second action. In some cases, the operations of this step may be performed by an agent as described according to FIG. 1.

Figure 3:
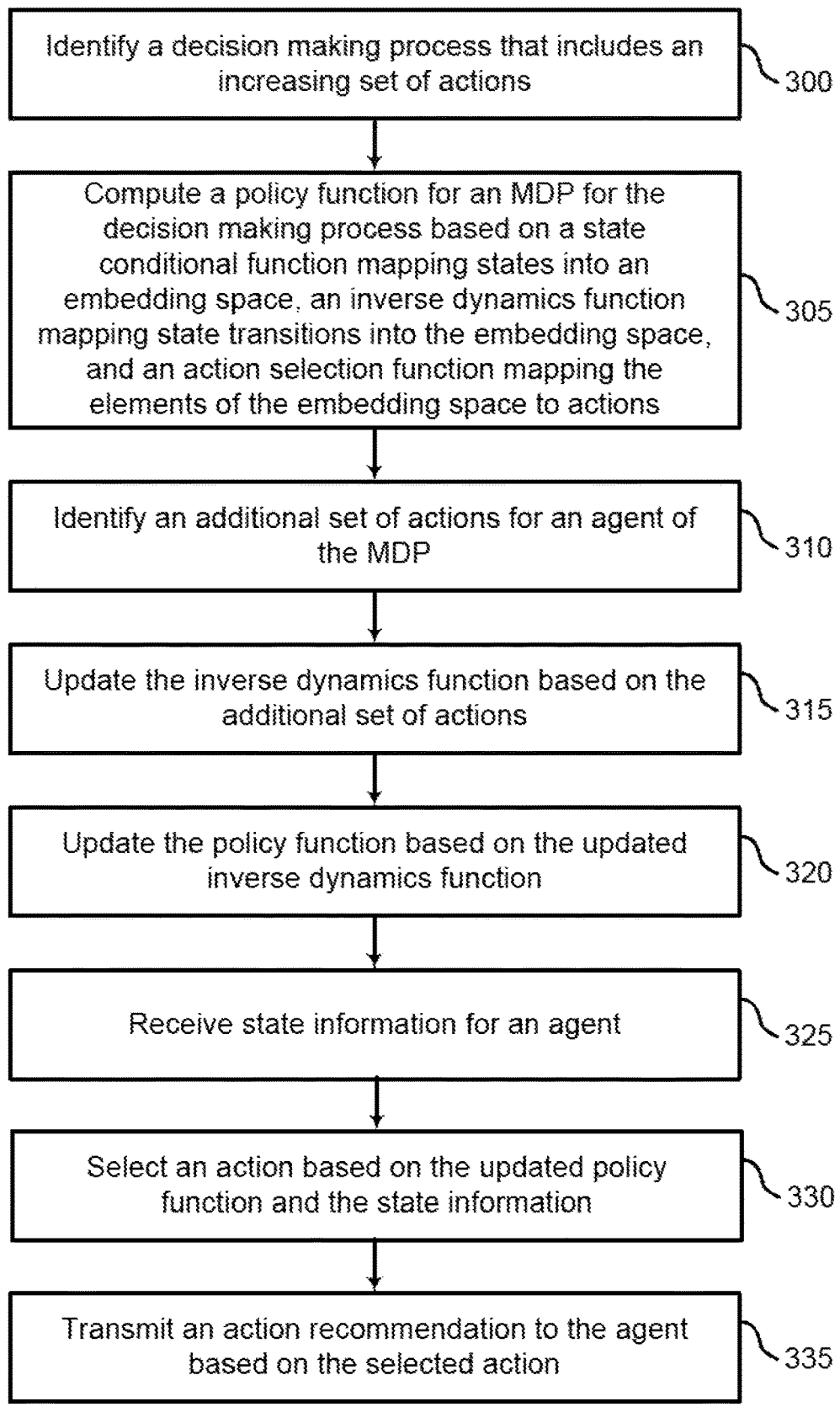
FIG. 3 shows an example of a process for reinforcement learning with autonomous adaptation according to aspects of the present disclosure.

FIG. 3 shows an example of a process for reinforcement learning with autonomous adaptation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 300, the system identifies a decision-making process that includes an increasing set of actions. In some cases, the operations of this step may be performed by an action set component as described according to FIG. 8. At operation 305, the system computes a policy function for an MDP for the decision-making process, where the policy function is computed based on a state conditional function mapping states into an embedding space, an inverse dynamics function mapping state transitions into the embedding space, and an action selection function mapping the elements of the embedding space to actions. In some cases, the operations of this step may be performed by a policy component as described according to FIG. 8. Further detail regarding an embodiment of operations 300 and 305 is described according to FIGS. 4 and 5.

At operation 310, the system identifies an additional set of actions (in the increasing set of actions) for an agent (i.e., the agent making the decision modeled by the MDP). In some cases, the operations of this step may be performed by an action set component as described according to FIG. 8. At operation 315, the system updates the inverse dynamics function based on the additional set of actions. In some cases, the operations of this step may be performed by a policy component as described according to FIG. 8. At operation 320, the system updates the policy function based on the updated inverse dynamics function. In some cases, the operations of this step may be performed by a policy component as described according to FIG. 8. Further detail regarding an example embodiment of operations 310, 315, and 320 is described according to FIG. 6.

At operation 325, the system receives state information for the agent. At operation 330, the system selects an action based on the updated policy function and the state information. At operation 335, the system transmits an action recommendation to the agent. In some cases, the operations of steps 325 through 335 may be performed by a selection component as described according to FIG. 8. Further detail regarding an embodiment of steps 325 through 335 is described according to FIG. 7.

Figure 4:
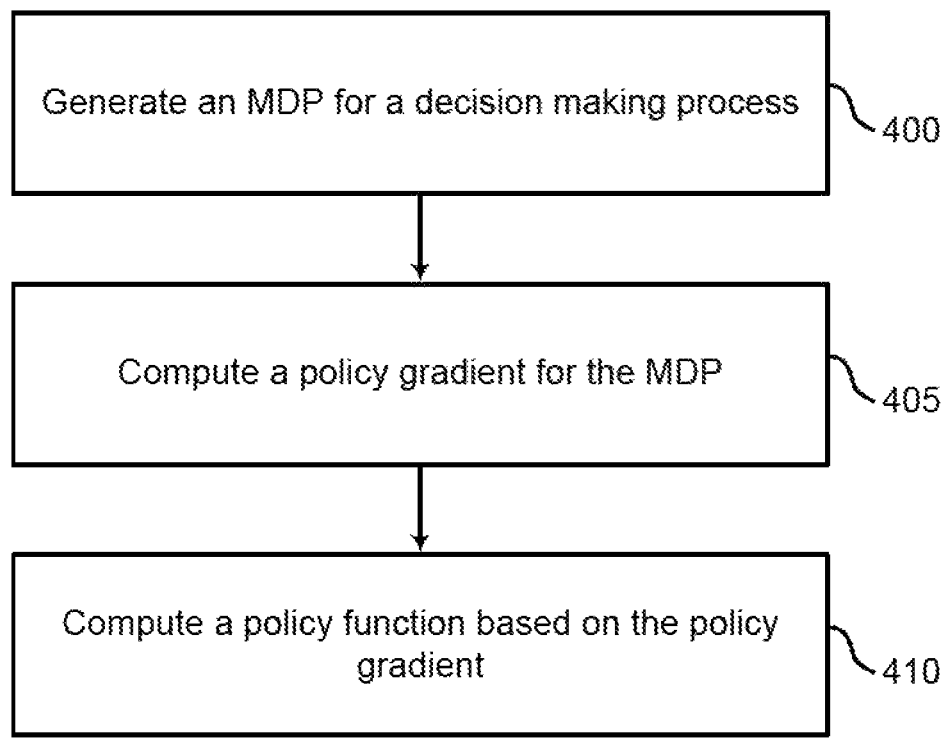
FIG. 4 shows an example of a process to compute a policy function according to aspects of the present disclosure.

FIG. 4 shows an example of a process to compute a policy function according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 400, the system generates an MDP for a decision-making process. In some cases, the operations of this step may be performed by a policy component as described according to FIG. 8. The decision-making process may represent a tool recommendation engine, where the actions are based on a changing set of tools; selection of an advertisement, where the actions are based on a set of available ads; a robot control mechanism, where actions represent a set of available actuator movements; a product recommendation system, where the actions are based on product availability; or a medical recommendation system, where the actions are based on a changing set of available medical interventions.

The MDP may include the set of actions, a set of states representing conditions or factors that may be useful in making a decision, and a state transition function representing how the actions impact the transition from one state to another. The state transition function may be subject to the condition that given the current state and action, the next state is independent of all the previous states and actions. The MDP may also include a reward function. For example, the reward function may provide a reward for reaching a destination or a desired state, and provide a penalty for each time period. In some cases, the MDP also includes a discount parameter that reduces future rewards.

At operation 405, the system computes a policy gradient for the MDP. At operation 410, the system computes a policy function based on the policy gradient. In some cases, the operations of operations 405 and 410 may be performed by a policy component as described according to FIG. 8.

The policy function may take a state and a set of available actions as input and provide a probability distribution over the set of available actions as output. The probability distribution indicates the likelihood that each of the available actions should be selected. In the deterministic case, the probability distribution provides a single action as a recommendation with probability one.

In some examples, the policy function may include a combination of separate models (e.g., neural networks) corresponding to several distinct functions. Specifically, the policy function, $\pi$, may be based on a state conditional function, $\beta$, mapping states into the embedding space, an inverse dynamics function, $\varphi$, mapping actions into the embedding space based on associated state transitions, and an action selection function, $\hat{\varphi}$, mapping the elements of the embedding space to an action or a probability distribution over available actions. The relationship between these functions is described according to FIG. 5.

The policy, $\pi$, which acts directly in the space of observed actions, may be deeply coupled with the number of actions that are available. Not only is the meaning of each parameter coupled with the number of actions, but the number of parameters that the policy uses is may depend on the number of possible actions.

To address this parameterization, instead of having the policy, $\pi$, act directly in the observed action space, $\mathcal{A}$, the agent may learn about the underlying structure of the action set in a way that makes the parameterization invariant to the number of actions that are available. To do this, the policy parameterization may be split into two components. The first component corresponds to the state conditional function responsible for making the decisions, $\beta: \mathcal{S} \times \hat{\varepsilon} \rightarrow [0,1]$, where $\hat{\varepsilon} \in \mathbb{R}^d$. The second component corresponds to $\hat{\varphi}: \hat{\varepsilon} \times \mathcal{A} \rightarrow [0, 1]$, an estimator of the relation $\varphi$, which is used to map the output of $\beta$ to an action in the set of available actions. That is, an $E_t \in \hat{\varepsilon}$ is sampled from $\beta(S_t)$ and then $\hat{\varphi}(E_t)$ is used to obtain the action $\mathcal{A}_t$. Together, $\beta$ and $\hat{\varphi}$ form a complete policy, $\pi$, and $\hat{\varepsilon}$ corresponds to the inferred structure in action space (i.e., the embedding space).

One of the benefits of estimating $\varphi$ with $\hat{\varphi}$ is the parameterization of $\beta$ is invariant to the cardinality of the action set. That is, changing the number of available actions does not depend on changing the number of parameters of $\beta$. Instead, the parameterization of $\hat{\varphi}$, the estimator of the underlying structure in action space, may be modified when new actions become available. The update to the parameters of $\hat{\varphi}$ can be performed using supervised learning methods that are independent of the reward signal, and thus more efficient.

While the parameterization of the policy using both $\beta$ and $\hat{\phi}$ has the advantages described above, the performance of $\beta$ may be constrained by the quality of $\hat{\phi}$, which is responsible for selecting an action from $\mathcal{A}$. Thus, $\hat{\phi}$ may be configured to enable $\beta$ to be both invariant to the cardinality of the action set for practical reasons and as expressive as a policy, $\pi$, explicitly parameterized for the currently available actions.

In the lifelong learning setting, $\hat{\phi}$ may be estimated in a way that provides bounded sub-optimality. Specifically, the inverse dynamics function, $\varphi$, that takes as input two states, s and s', and produces as output a prediction of which $e \in \varepsilon$ caused the transition from s to s' may be used. Since the agent does not know $\phi$, when the agent observes a transition from s to s' via action a, the agent does not know which e caused this transition.

Thus, $\varphi$ may not be trained to make predictions using the actual action, e, that caused the transition. Instead, $\hat{\phi}$ may be used to transform the prediction of $\varphi$ from $e \in \varepsilon$ to $a \in \mathcal{A}$, and train both $\varphi$ and $\hat{\phi}$, so that this process accurately predicts which action, a, caused the transition from s to s'. Moreover, rather than viewing $\varphi$ as a deterministic function mapping states s and s' to predictions e, $\varphi$ may be a distribution over $\varepsilon$ given two states, s and s'.

For any given $\mathcal{M}_k$ in L-MDP $\mathcal{L}$ $\beta_k$ and $\hat{\phi}_k$ may denote the two components of the overall policy, and $\pi^{}_k$ may be the overall policy that can be represented using some fixed $\hat{\phi}_k$. Then the sub-optimality of $\pi^{}_k$ may be limited as follows.

For an L-MDP $\mathcal{M}_k$, if there exists $\varphi: S \times S \times \hat{\varepsilon} \to [0.1]$ and $\hat{\phi}_k: \hat{\varepsilon} \times \mathcal{A} \to [0.1]$ such that $$\sup_{s \in S, a \in \mathcal{A}} \quad \text{(Eq. 4)}$$

$$KL\big(P(S_{t+1} \mid S_t = s, A_t = a) \big\| P(S_{t+1} \mid S_t = s, A_t = \hat{A})\big) \leq \delta_k^2/2,$$

Where $\hat{A} \sim \hat{\phi}_k(\cdot \mid \hat{E})$ and $\hat{E} \sim \varphi(\cdot \mid S_t, S_{t+1})$, then $$v^{\mu^*}(s_0) - v^{\pi^{**}_k}(s_0) \leq \frac{\gamma(\rho \epsilon_k + \delta_k)}{(1-\gamma)^2} R_{max}. \quad \text{(Eq. 5)}$$

By quantifying the impact $\hat{\phi}$ has on the sub-optimality of achievable performance, Eq. 4 provides constraints for estimating $\hat{\phi}$. Effectively, Eq. 4 ensures that $\hat{\phi}$ can be used to generate an action corresponding to any s to s' transition. This allows $\beta$ to leverage $\hat{\phi}$ and choose the action that induces the state transition for maximizing performance. Thereby, sub-optimality may be minimized if $\hat{\phi}$ and $\varphi$ are optimized to reduce the supremum of the divergence overall s and a. In practice, the agent may not have access to all possible states. Rather the agent may have access to a limited set of samples collected from interactions with the environment. Therefore, instead of the supremum, minimizing the average over all s and a from a set of observed transitions is;

$$\mathcal{L}(\hat{\phi}, \varphi) := \Sigma_{s \in S} \Sigma_{a \in \mathcal{A}_k} P(s,a) KL(P(s'|s,a) \| P(s'|s,\hat{a})). \quad \text{(Eq. 6)}$$

Eq. 6 suggests that $\mathcal{L}(\hat{\phi}, \varphi)$ would be minimized when $\hat{a}$ equals a, but using Eq. 6 directly in the stated form may be inefficient if it depends on computing the divergence over all probable $s' \in S$ for a given s and a. Therefore, the following property may be used. For some constant C, $-\mathcal{L}(\hat{\phi}, \varphi)$ is lower bounded by:

$$\sum_{s \in S} \sum_{a \in \mathcal{A}_k} \sum_{s' \in S} P(s, a, s')(\mathbb{E}[\log \hat{\phi}(\hat{a} \mid \hat{e})\,\hat{e} \sim \quad \text{(Eq. 7)}$$

$$\varphi(\cdot \mid s, s') - KL(\varphi(\hat{e} \mid s, s') \| P(\hat{e} \mid s, s'))) + C$$

Minimizing $\mathcal{L}(\hat{\phi}, \varphi)$ is equivalent to maximizing $-\mathcal{L}(\hat{\phi}, \varphi)$. In this form, it is possible to optimize Eq. 7 by using the observed (s, a, s') samples. As this form is similar to the objective for a variational auto-encoder, the inner expectation can be efficiently optimized using well-known reparameterization techniques. P($\hat{e}|$s, s') is the prior on $\hat{e}$, and is treated as a hyper-parameter that allows the divergence to be computed in closed form.

This optimization procedure may hinge on individual transitions, (s, a, s'), and is independent of the reward signal. Hence, this optimization procedure may be implemented with a supervised learning procedure. This means that learning the parameters for $\hat{\phi}$ may rely on fewer samples than optimizing $\beta$ (which corresponds to the RL problem). This is beneficial because $\hat{\phi}$, the component of the policy where new parameters should be added when new actions become available, can be updated efficiently. As both $\beta$ and $\varphi$ are invariant to action cardinality, there may be various options on new parameters when new actions become available.

FIG. 5 shows an example of an action set embedding according to aspects of the present disclosure. The example shown represents the relationships between actions and state transitions 500 (s, a, s'), embedding space 505 ($\varepsilon$), states 510 (S), selection distribution 515 (a, or a probability distribution over $\mathcal{A}$), state conditional function 520 ($\beta$), inverse dynamics function 525 ($\varphi$), and action selection function 530 ($\hat{\phi}$).

As shown, state conditional function 520 maps states 510 to the embedding space 505; inverse dynamics function 525 maps the set of actions and state transitions 500 to the embedding space 505; and action selection function 530 maps the embedding space 505 to an action or selection distribution 515.

Figure 6:
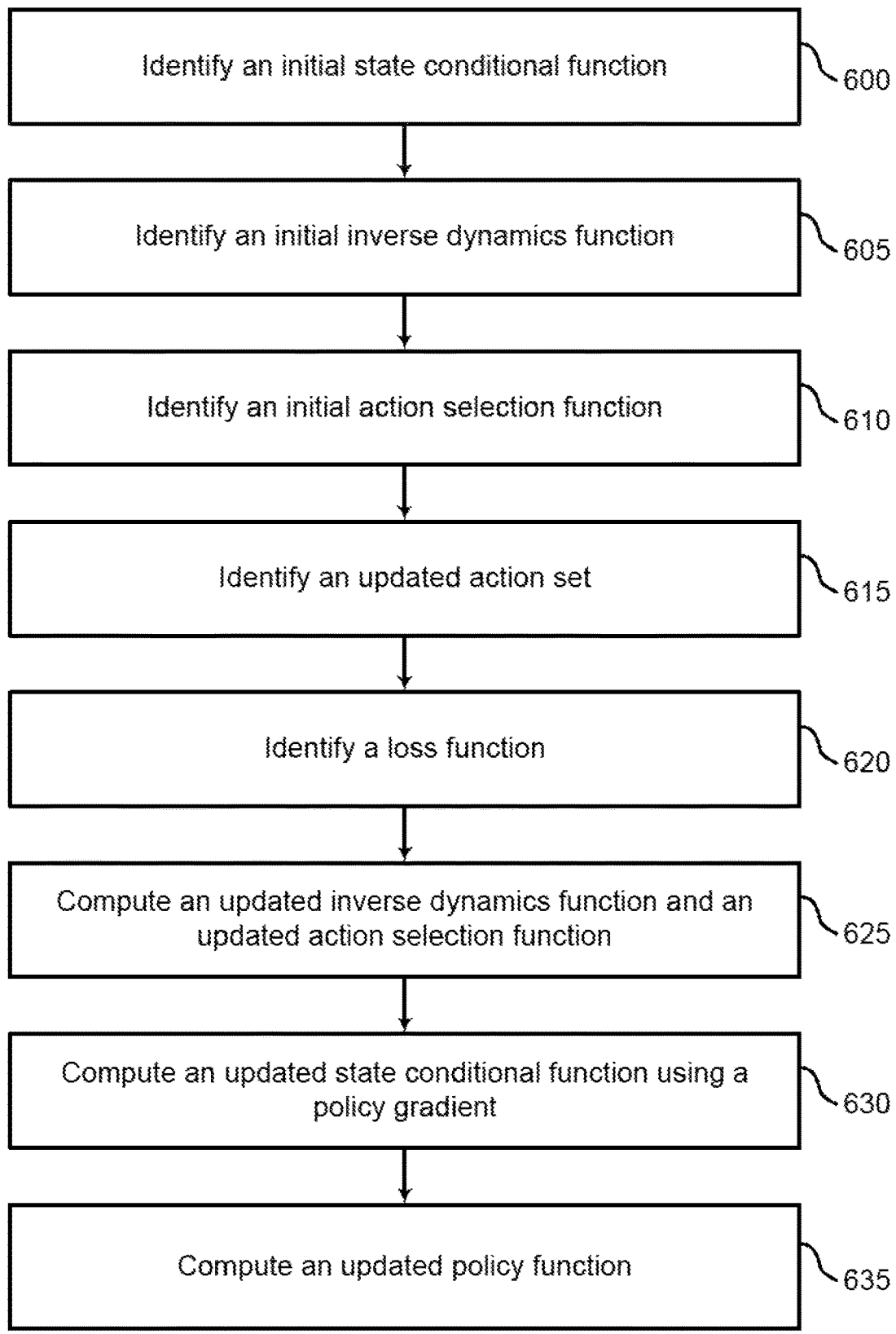
FIG. 6 shows an example of a process to update a policy function according to aspects of the present disclosure.

FIG. 6 shows an example of a process to update a policy function according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 600, the system identifies an initial state conditional function. At operation 605, the system identifies an initial inverse dynamics function. At operation 610, the system identifies an initial action selection function. In some cases, the operations of operations 600, 605 and 610 may be performed by a policy component as described according to FIG. 8. operations 600, 605 and 610 are described in more detail according to FIG. 4.

At operation 615, the system identifies an updated action set. In some cases, the operations of this step may be performed by a policy component as described according to FIG. 8. In various examples, if the decision-making process represents a tool recommendation engine, the actions may be based on an additional set of tools; if the decision-making process represents selection of an advertisement, the actions may be based on additional ads; if the decision-making process represents a robot control mechanism, the actions may represent an updated set of available actuator movements; if the decision-making process represents a product recommendation system, the actions may be based on newly available products; and if the decision-making process represents a medical recommendation system, the actions may be based on a newly available medical interventions.

At operation 620, the system identities a loss function. At operation 625, the system computes an updated inverse dynamics function and an updated action selection function by maximizing a lower bound of the loss function. At operation 630, the system computes an updated state conditional function using a policy gradient. At operation 635, the system computes an updated policy function based on the updated inverse dynamics function, the updated action selection function, and the updated state conditional function. In some cases, the operations of step 620, 625, 630 and 635 may refer to, or be performed by, a policy component as described according to FIG. 8. The loss function may correspond to the loss function described according to FIG. 4.

When a new set of actions, $\mathcal{A}_{k+1}$, becomes available, the agent leverages the existing knowledge and quickly adapt to the new action set. Therefore, during a change in $\mathcal{M}_k$, the ongoing components of the policy, $\beta^*_{k-1}$ and $\varphi^*_{k-1}$, in $\mathcal{M}_{k-1}$ are carried over, i.e., $\beta_k := \beta^*_{k-1}$ and $\phi_k := \phi^*_{k-1}$. For lifelong learning, the learning procedure may be designed to minimize the sub-optimality in each $\mathcal{M}_k$, for all k.

That is, in an L-MDP, let $\Delta$ denote the difference of performance between $v^{\mu^*}$ and the achievable using the policy parameterization, then the overall sub-optimality can be expressed as, $$v^{\mu^*}(s_0) - v^{\beta_1 \phi_1}_{\mathcal{M}_1}(s_0) = \underbrace{\sum_{k=1}^{\infty}\left(v^{\beta_k \hat{\phi}^*_k}_{\mathcal{M}_k}(s_0) - v^{\beta_k \hat{\phi}_k}_{\mathcal{M}_k}(s_0)\right)}_{\text{Adaptation}} + \underbrace{\sum_{k=1}^{\infty}\left(v^{\beta^*_k \hat{\phi}^*_k}_{\mathcal{M}_k}(s_0) - v^{\beta_k \hat{\phi}_k}_{\mathcal{M}_k}(s_0)\right)}_{\text{Policy Improvement}} + \Delta, \quad \text{(Eq. 8)}$$

where $\mathcal{M}_k$ is used in the subscript to emphasize the respective MDP in $\mathcal{L}$.

Eq. 8 illustrates the impact of $\beta$ and $\hat{\phi}$ by splitting the learning process into an adaptation phase and a policy improvement phase. These two iterative phases may be the basis of an algorithm for solving an L-MDP $\mathcal{L}$. Such an algorithm may be referred to as a lifelong adaptation and improvement for changing actions (LAICA) algorithm.

When new actions become available, adaptation may initially to cause a performance drop because the agent has no information about when to use the new actions. Thus, initial uses of the new actions may be inappropriate. However, following Eq. 7, $\hat{\phi}$ is updated to efficiently infer the underlying structure and minimize the performance drop. That is, for every $\mathcal{M}_k$, $\hat{\phi}_k$ is first adapted to $\hat{\phi}^*_k$ in the adaptation phase by adding more parameters for the new set of actions and then optimizing Eq. 7. After that, $\hat{\phi}^*_k$ may be fixed and $\beta_k$ is improved towards $\beta^*_k$ in the policy improvement phase, by updating the parameters of $\beta_k$ using the policy gradient. These two procedures may be performed sequentially whenever $\mathcal{M}_{k-1}$ transitions to $\mathcal{M}_k$, for all k, in an L-MDP $\mathcal{L}$.

In an example embodiment, the policy function may be updated according to Algorithm 1:

---

Algorithm 1: Lifelong Adaptation and Improvement for Changing Actions (LAICA)

```
 1  Initialize β₀*, φ̂₀*, φ₀*
 2  for change k = 1, 2... do
 3  |  β_k ← β_{k-1}*                        ⎫
 4  |  φ_k ← φ_{k-1}*                        ⎪
 5  |  φ̂_k ← φ̂_{k-1}*                       ⎬  Reuse past
 6  |  Add parameters in φ̂_k for new actions ⎪  knowledge
 7  |  Buffer ℬ = {}                         ⎭
 8  |  for episode = 0, 1, 2... do           ⎫
 9  |  |  for t = 0, 1, 2... do              ⎪
10  |  |  |  Execute random α_t and observe s_{t+1}  ⎪
11  |  |  |  Add transition to ℬ             ⎬  Adapt
12  |  |  for iteration = 0, 1, 2... do      ⎪  φ̂_k to φ̂_k*
13  |  |  |  Sample batch b ~ ℬ              ⎪
14  |  |  |  Update φ̂_k and φ_k by maximizing ℒᵇ(φ̂_k, φ_k) for b ⎭
15  |
16  |  for episode = 0, 1, 2... do           ⎫
17  |  |  for t = 0, 1, 2... do              ⎪
18  |  |  |  Sample ê_t ~ β_k(·|s_t)         ⎪
19  |  |  |  Map ê_t to an action αt using φ̂_k*(e) ⎬  Improve
20  |  |  |  Execute α_t and observe s_{t+1}, T_b  ⎪  β_k to β_k*
21  |  |  |  Update β_k using any policy gradient algorithm ⎪
22  |  |  |  Update critic by minimizing TD error.  ⎭
```

---

A LAICA algorithm such as Algorithm 1 represents an advance over conventional RL techniques due at least in part to the state conditional function, $\beta$, being invariant to the action cardinality can be readily leveraged after changes without having to be re-initialized. Efficiently re-using past knowledge can improve data efficiency over the approach that learns from scratch. The improved performance of LAICA can also be attributed at least in part to the adaptation procedure, which infers the underlying structure in the space of actions.

Figure 7:
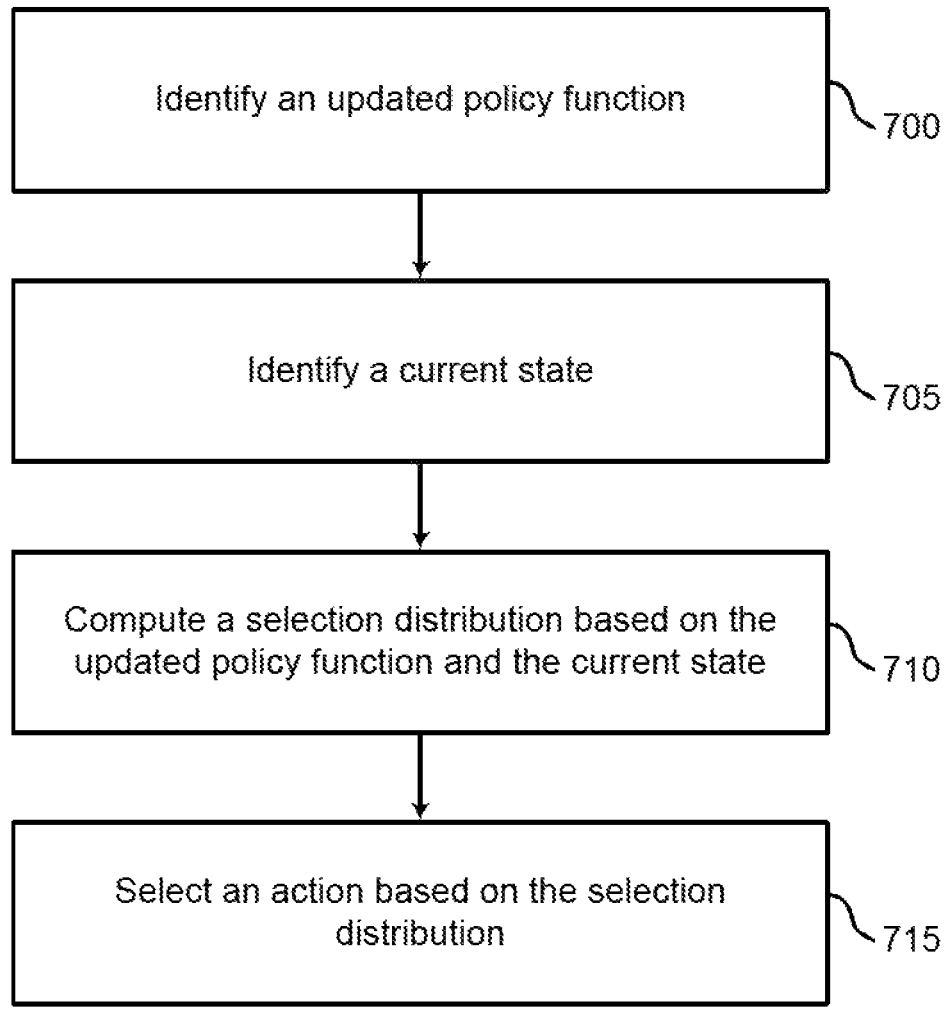
FIG. 7 shows an example of a process for selecting an action according to aspects of the present disclosure.

FIG. 7 shows an example of a process for selecting an action according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 700, the system identifies an updated policy function. In some cases, the operations of this step may be performed by a selection component as described according to FIG. 8. Further detail regarding an example embodiment for updating the policy function is described according to FIG. 6.

At operation 705, the system identifies a current state. In some cases, the operations of this step may be performed by a selection component as described according to FIG. 8. In various examples, if the decision-making process represents a tool recommendation engine, the state may be based on a state of the tool or a user history; if the decision-making process represents selection of an advertisement, the state may be based on a browsing history, a user profile, or a context; if the decision-making process represents a robot control mechanism, the state may represent an a position of a robot control arm a position of the robot, or a position of a target; if the decision-making process represents a product recommendation system, the state may be based on a customer profile or history; and if the decision-making process represents a medical recommendation system, the actions may be based on a status of a patient or an electronic medical record. The state may be determined using external sensors, communication with an external database, or any other method of obtaining external state information.

At operation 710, the system computes a selection distribution based on the updated policy function and the current state. In some cases, the operations of this step may be performed by a selection component as described according to FIG. 8. In some examples, the distribution represents a single recommended action. In other examples, the distribution represents a probability across multiple actions.

At operation 715, the system selects an action based on the selection distribution. In some cases, the operations of this step may be performed by a selection component as described according to FIG. 8. For example, a single action may be selected, or a random process may be used to select an action based on a probability distribution provided at step 710.

Figure 8:
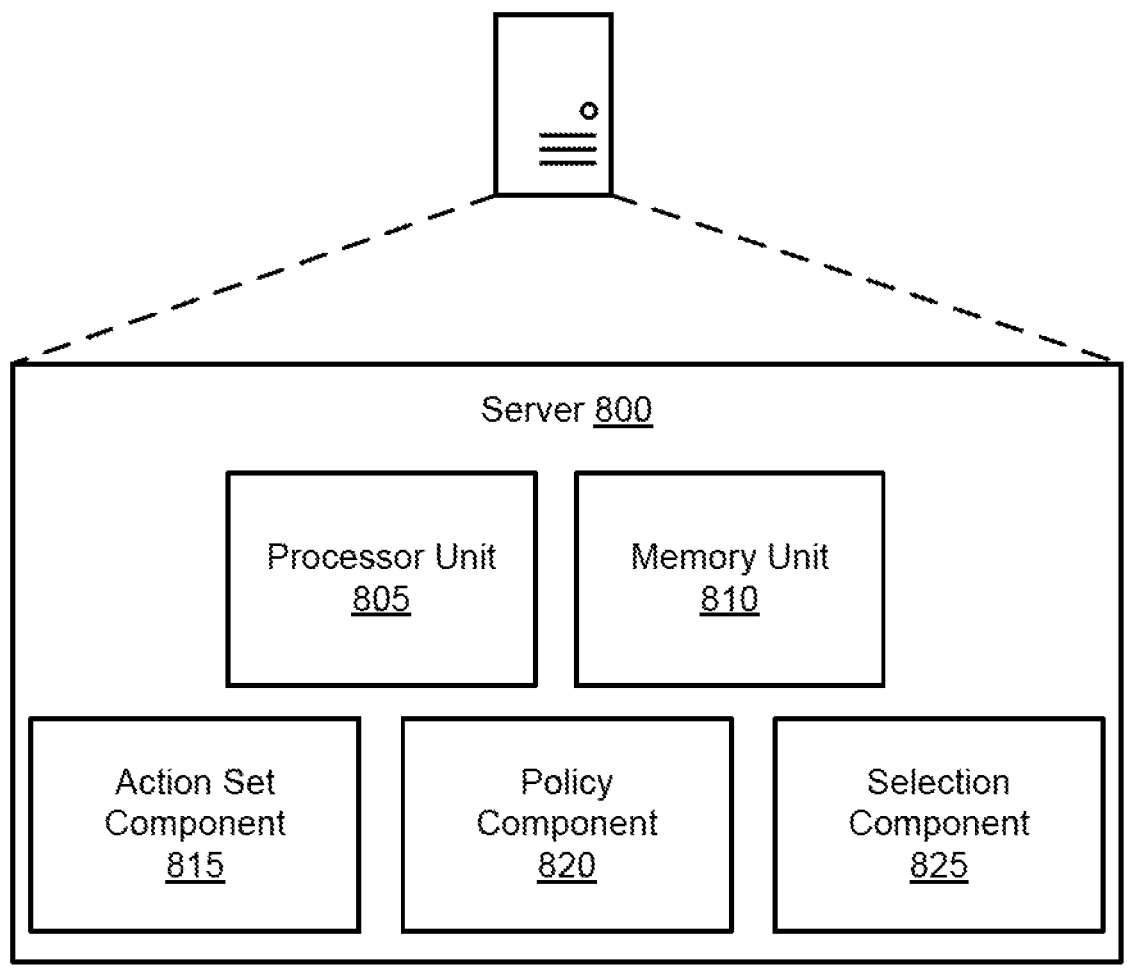
FIG. 8 shows an example of a reinforcement learning apparatus according to aspects of the present disclosure.

FIG. 8 shows an example of a reinforcement learning apparatus according to aspects of the present disclosure. The a reinforcement learning apparatus may include server 800, may be an example of, or include aspects of, the corresponding element or elements described according to FIG. 1. Server 800 may include processor unit 805, memory unit 810, action set component 815, policy component 820, and selection component 825.

A processor unit 805 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A memory unit 810 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Action set component 815 may identify a decision-making process that includes an increasing set of actions. Action set component 815 may also identify an additional set of actions in the increasing set of actions. In some examples, the decision-making process includes a tool recommendation engine, and the increasing set of actions is based on a changing set of tools. In some examples, the decision-making process includes selecting an advertisement, and the increasing set of actions includes a set of available ads. In some examples, the decision-making process includes a robot control mechanism, and the increasing set of actions includes a set of available actuator movements. In some examples, the decision-making process includes a product recommendation system, and the increasing set of actions is based on product availability. In some examples, the decision-making process includes a medical recommendation system, and the increasing set of actions is based on a changing set of available medical interventions.

Policy component 820 may compute a policy function for an MDP for the decision-making process, where the policy function is computed based on a state conditional function mapping states into an embedding space, an inverse dynamics function mapping state transitions into the embedding space, and an action selection function mapping the elements of the embedding space to actions. Policy component 820 may also update the inverse dynamics function based on the additional set of actions. Policy component 820 may also update the policy function based on the updated inverse dynamics function. In some examples, the policy function includes a composition of the state conditional function and the action selection function.

Policy component 820 may also update the state conditional function and the action selection function based on the additional set of actions, where the updated policy function is based on the updated state conditional function and the updated action selection function. In some examples, the action selection function and the inverse dynamics function are updated in a first phase, and the state conditional function is updated in a second phase based on the updated action selection function. In some examples, the state conditional function, the action selection function and the inverse dynamics function are updated simultaneously.

Policy component 820 may compute the policy function by maximizing a lower bound of a loss function (or minimizing an upper bound), where the action selection function and the inverse dynamics function are updated based on the maximization. In some examples, the loss function is based on a divergence of states and actions from a set of observed state transitions. Policy component 820 may also compute a policy gradient, where the policy function is computed based on the policy gradient.

In some examples, policy component 820 may include one or more neural networks (i.e., corresponding to the state conditional function, the action selection function, and the inverse dynamics function). An artificial neural network (ANN) may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times. In some examples, an ANN is trained using the reward function of the MDP.

Selection component 825 may select an action based on the updated policy function. In some cases, selection component 825 may receive state information for an agent, and transmit an action recommendation to the agent based on the updated policy function and the state information.

Figure 9:
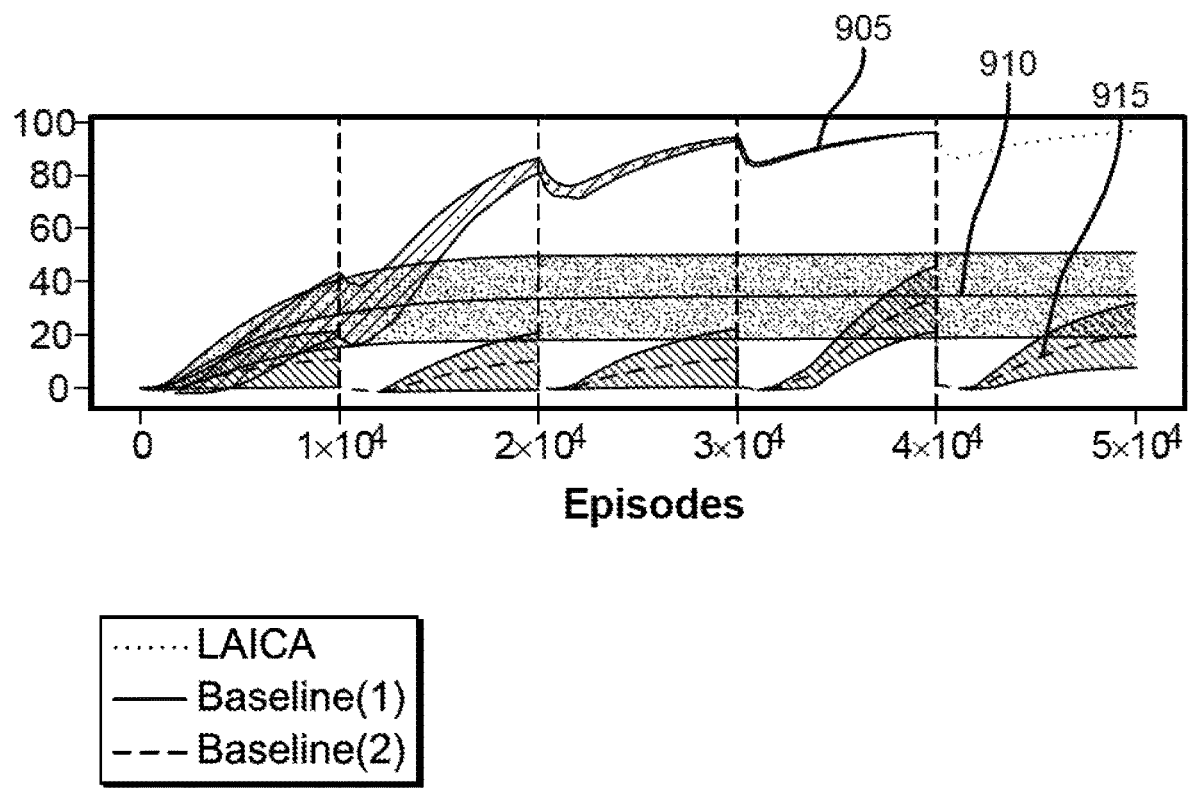
FIG. 9 shows an a graph comparing the performance of different lifelong learning models according to aspects of the present disclosure.

FIG. 9 shows an a graph 900 comparing the performance of different lifelong learning models according to aspects of the present disclosure. Graph 900 includes LAICA model performance 905, a first baseline 910, and a second baseline 915. The vertical axis represents a measure of performance, and the horizontal axis represents a number of time periods.

The first baseline 910 represents a lifelong learning model that does not incorporate the new actions, whereas second baseline 915 represents a model that learns from scratch after the introduction of new actions. The LAICA model performance 905 shows a dip in performance after the introduction of new actions to the action set as the model learns to incorporate those actions. However, the introduction of new actions eventually results in additional learning that leverages the old learning to increase performance to a range not achievable with the first baseline 910, and the second baseline 915

Accordingly, the present disclosure includes the following embodiments.

A method for reinforcement learning with autonomous adaptation is described. Embodiments of the method may identify a decision-making process that includes an increasing set of actions, computing a policy function for a Markov decision process (MDP) for the decision-making process, wherein the policy function is computed based on a state conditional function mapping states into an embedding space, an inverse dynamics function mapping state transitions into the embedding space, and an action selection function mapping the elements of the embedding space to actions, identifying an additional set of actions in the increasing set of actions, updating the inverse dynamics function based at least in part on the additional set of actions, updating the policy function based on the updated inverse dynamics function, and selecting an action based on the updated policy function.

An apparatus for reinforcement learning is described. The apparatus may include a processor, memory in electronic communication with the processor, and instructions stored in the memory. The instructions may be operable to cause the processor to identify a decision-making process that includes an increasing set of actions, compute a policy function for an MDP for the decision-making process, wherein the policy function is computed based on a state conditional function mapping states into an embedding space, an inverse dynamics function mapping state transitions into the embedding space, and an action selection function mapping the elements of the embedding space to actions, identify an additional set of actions in the increasing set of actions, update the inverse dynamics function based at least in part on the additional set of actions, update the policy function based on the updated inverse dynamics function, and select an action based on the updated policy function.

A non-transitory computer-readable medium storing code for reinforcement learning is described. In some examples, the code comprises instructions executable by a processor to: identify a decision-making process that includes an increasing set of actions, compute a policy function for an MDP for the decision-making process, wherein the policy function is computed based on a state conditional function mapping states into an embedding space, an inverse dynamics function mapping state transitions into the embedding space, and an action selection function mapping the elements of the embedding space to actions, identify an additional set of actions in the increasing set of actions, update the inverse dynamics function based at least in part on the additional set of actions, update the policy function based on the updated inverse dynamics function, and select an action based on the updated policy function.

In some examples, the policy function comprises a composition of the state conditional function and the action selection function. Some examples of the method, apparatus, non-transitory computer-readable medium, and system described above may further include updating the state conditional function and the action selection function based at least in part on the additional set of actions, wherein the updated policy function is based at least in part on the updated state conditional function and the updated action selection function.

In some examples, the action selection function and the inverse dynamics function are updated in a first phase, and the state conditional function is updated in a second phase based at least in part on the updated action selection function. In some examples, the state conditional function, the action selection function and the inverse dynamics function are updated simultaneously.

Some examples of the method, apparatus, non-transitory computer-readable medium, and system described above may further include maximizing a lower bound of a loss function, wherein the action selection function and the inverse dynamics function are updated based on the maximization. In some examples, the loss function is based on a divergence of states and actions from a set of observed state transitions. Some examples of the method, apparatus, non-transitory computer-readable medium, and system described above may further include computing a policy gradient, wherein the policy function is computed based on the policy gradient.

In some examples, the decision-making process comprises a tool recommendation engine and the increasing set of actions is based at least in part on a changing set of tools. In some examples, the decision-making process comprises selecting an advertisement and the increasing set of actions comprises a set of available ads. In some examples, the decision-making process comprises a robot control mechanism and the increasing set of actions comprises a set of available actuator movements. In some examples, the decision-making process comprises a product recommendation system, and an increasing set of actions is based at least in part on product availability. In some examples, the decision-making process comprises a medical recommendation system, and an increasing set of actions is based at least in part on a changing set of available medical interventions.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for decision-making, comprising:
identifying a decision-making process that includes an increasing set of actions;
computing a policy function for a Markov decision process (MDP) for the decision-making process, wherein the policy function is computed based on a state conditional function mapping states into an embedding space, an inverse dynamics function mapping state transitions into the embedding space, and an action selection function mapping elements of the embedding space to actions;
identifying an additional set of actions for an agent of the MDP;
updating the inverse dynamics function based at least in part on the additional set of actions;
updating the policy function based on the updated inverse dynamics function;
receiving state information for the agent;
selecting an action based on the updated policy function and the state information; and
transmitting an action recommendation to the agent based on the selected action.

2. The method of claim 1, wherein:
the policy function comprises a composition of the state conditional function and the action selection function, and updating the policy function incorporates parameters learned during the computing the policy function.

3. The method of claim 1, further comprising:
updating the state conditional function and the action selection function based at least in part on the additional set of actions, wherein the updated policy function is based at least in part on the updated state conditional function and the updated action selection function.

4. The method of claim 3, wherein:
the action selection function and the inverse dynamics function are updated in a first phase and the state conditional function is updated in a second phase based at least in part on the updated action selection function.

5. The method of claim 3, wherein:
the state conditional function, the action selection function and the inverse dynamics function are updated simultaneously.

6. The method of claim 1, further comprising:
maximizing a lower bound of a loss function, wherein the action selection function and the inverse dynamics function are updated based on the maximization.

7. The method of claim 6, wherein:
the loss function is based on a divergence of states and actions from a set of observed state transitions.

8. The method of claim 1, further comprising:
computing a policy gradient, wherein the policy function is computed based on the policy gradient.

9. The method of claim 1, wherein:
the decision-making process comprises a tool recommendation engine and the increasing set of actions is based at least in part on a changing set of tools.

10. The method of claim 1, wherein:
the decision-making process comprises selecting an advertisement and the increasing set of actions comprises a set of available ads.

11. The method of claim 1, wherein:
the decision-making process comprises a robot control mechanism and the increasing set of actions comprises a set of available actuator movements.

12. The method of claim 1, wherein:
the decision-making process comprises a product recommendation system and the increasing set of actions is based at least in part on product availability.

13. The method of claim 1, wherein:
the decision-making process comprises a medical recommendation system and the increasing set of actions is based at least in part on a changing set of available medical interventions.

14. An apparatus for reinforcement learning, comprising:
a processor and a memory storing instructions and in electronic communication with the processor, the processor being configured to execute the instructions to:
compute a policy function for a Markov decision process (MDP) model of a decision-making process, wherein the policy function is computed based on a state conditional function mapping states into an embedding space, an inverse dynamics function mapping state transitions into the embedding space, and an action selection function mapping elements of the embedding space to actions;

identify an additional set of actions in an increasing set of actions of the MDP;

update the inverse dynamics function and the action selection function during a first phase based at least in part on the additional set of actions by maximizing a lower bound of a loss function;

update the state conditional function during a second phase following the first phase using a policy gradient; and select an action using the updated state conditional function and the updated action selection function.

15. The apparatus of claim 14, wherein:
the policy function comprises a neural network including a composition of the state conditional function and the action selection function.

16. The apparatus of claim 14, wherein:
the loss function is based on a divergence of states and actions from a set of observed state transitions.

17. The apparatus of claim 14, the processor being further configured to execute the instructions to:
update a critic function by minimizing a temporal difference error.

18. A non-transitory computer-readable medium storing code for reinforcement learning, the code comprising instructions executable by a processor to:

compute a policy function for a Markov decision process (MDP) for a decision-making process that includes an increasing set of actions;

receive state information for an agent of the decision making process;

transmit a recommended action to the agent based on the policy function and the state information;

receive an additional set of actions from the agent;

update the policy function based at least in part on the additional set of actions and parameters learned during the computing the policy function;

receive subsequent state information for the agent; and transmit a subsequent recommended action to the agent based on the updated policy function and the subsequent state information.

19. The non-transitory computer-readable medium of claim 18, the code further comprising instructions executable by the processor to:

update a state conditional function and an action selection function based at least in part on the additional set of actions, wherein the updated policy function is based at least in part on the updated state conditional function and the updated action selection function.

20. The non-transitory computer-readable medium of claim 19, the code further comprising instructions executable by the processor to:

maximize a lower bound of a loss function, wherein the action selection function and the inverse dynamics function are updated based on the maximization.

* * * * *